Dec. 26, 1950   G. W. HULT ET AL   2,535,494
BUILDING STRUCTURE

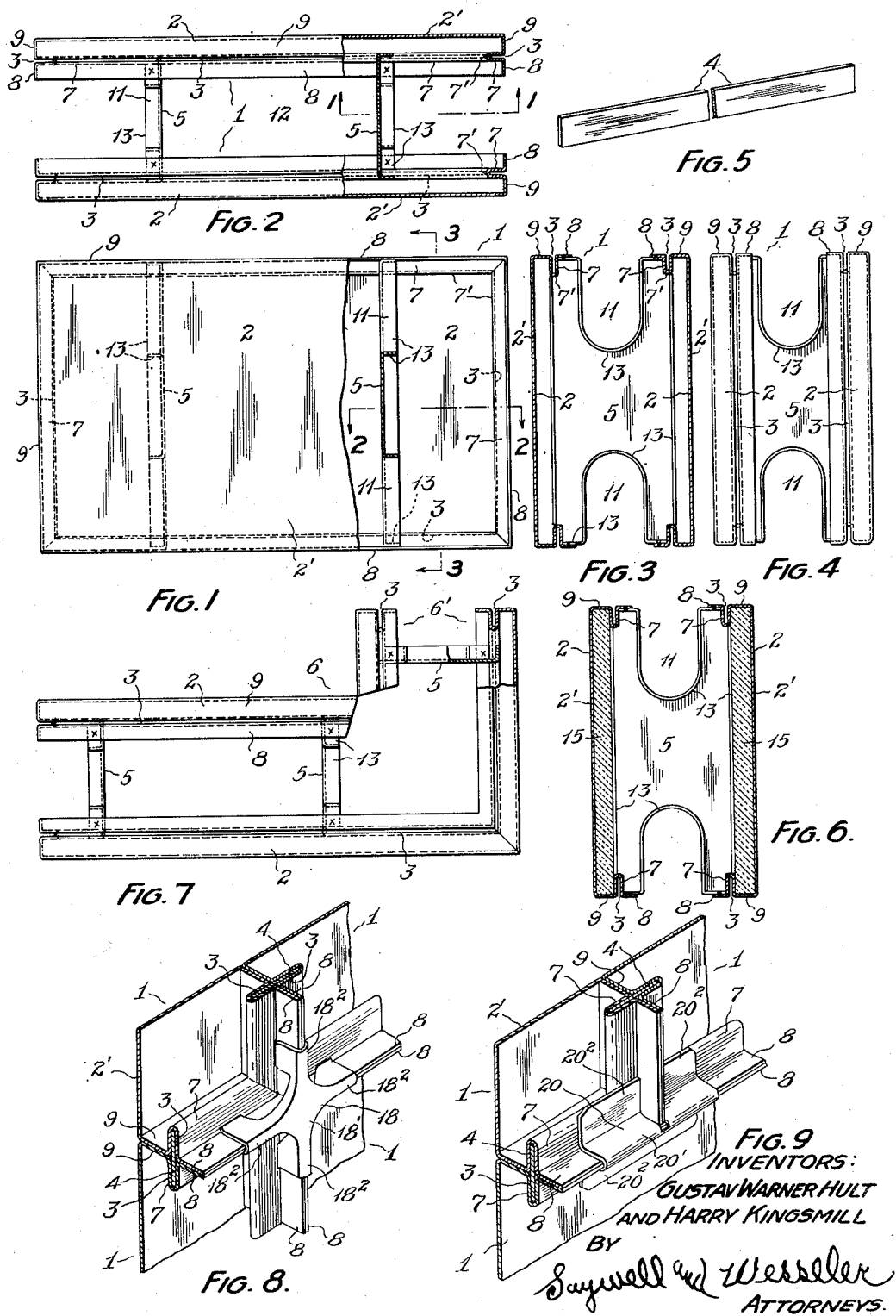

Original Filed Dec. 12, 1939   5 Sheets-Sheet 2

INVENTORS:
GUSTAV WARNER HULT
AND HARRY KINGSMILL
BY
Saywell and Wessler
ATTORNEYS.

Dec. 26, 1950   G. W. HULT ET AL   2,535,494
BUILDING STRUCTURE

Original Filed Dec. 12, 1939   5 Sheets-Sheet 3

INVENTORS:
GUSTAV WARNER HULT
AND HARRY KINGSMILL
BY
Saywell and Wesseler
ATTORNEYS.

Dec. 26, 1950  G. W. HULT ET AL  2,535,494
BUILDING STRUCTURE

Original Filed Dec. 12, 1939  5 Sheets-Sheet 4

INVENTORS:
GUSTAV WARNER HULT
AND HARRY KINGSMILL
BY
*Saywell & Wesseler*
ATTORNEYS.

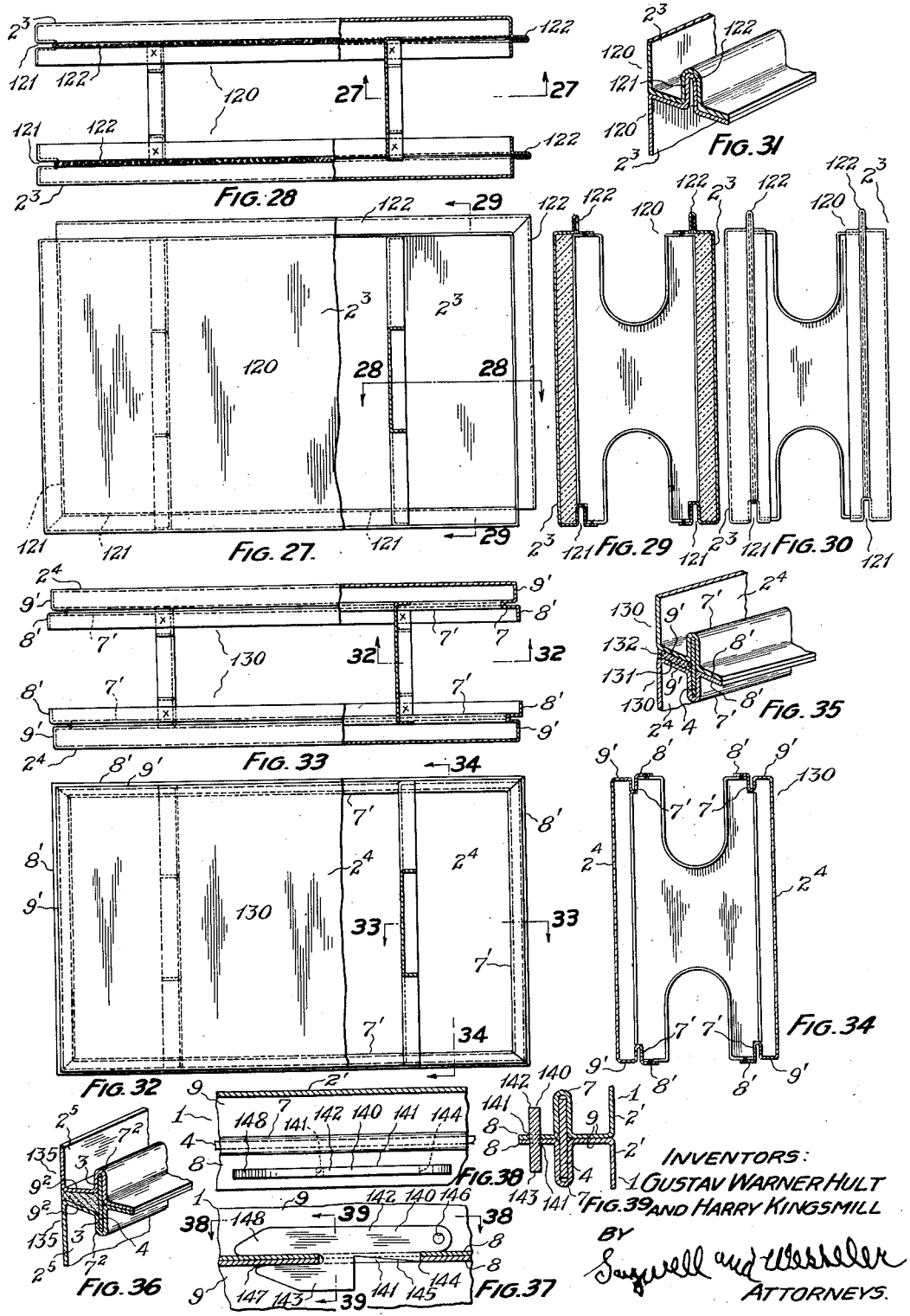

Patented Dec. 26, 1950

2,535,494

UNITED STATES PATENT OFFICE 2,535,494

BUILDING STRUCTURE

Gustav Warner Hult and Harry Kingsmill, Cleveland, Ohio; said Hult assignor to said Kingsmill Substituted for abandoned application Serial No. 308,806, December 12, 1939. This application June 9, 1944, Serial No. 539,484

11 Claims. (Cl. 189—34)

This application is a new application filed in place of our abandoned application Serial No. 308,806, filed December 12, 1939.

Our invention relates to improvements in building structures, and particularly to an improved hollow building block and the structures that may be formed from a plurality thereof combined with other cooperating well known building elements such as foundations, roofs, floors, partitions, doors, windows, etc. Preferably, the improved hollow building block is formed of any suitable metal or alloys of metal, but the same or equivalent block structures may be made of wood, suitable compositions, etc., particularly if the improved block is utilized for toy building sets, models, etc.

The purpose of our invention is to provide a new construction of hollow metal building walls, both exterior and interior, which is simple, practical, economical, and easy to erect.

The annexed drawings and the following description set forth in detail certain designs illustrating our improvements in building structures, such illustrations, however, showing only a few of the various forms of structures in which the principles of our invention may be embodied.

In said annexed drawings:

Figure 1 is a side elevation, partially broken away, on the plane indicated by the line 1—1, Figure 2, of a preferred form of the improved hollow building block forming an essential element of our invention;

Figure 2 is a plan view of the block shown in Figure 1, the view being partially in horizontal section, longitudinally of the block, and indicated by the line 2—2, Figure 1;

Figure 3 is a vertical cross-section, taken in the plane indicated by the line 3—3, Figure 1;

Figure 4 is an end view of the block shown in Figure 1;

Figure 5 is a broken perspective view of an aligning and coupling bar for holding a plurality of adjacent blocks in assembled position;

Figure 6 is a vertical cross-section, similar to Figure 3, showing a block having its opposed face side walls lined with insulating material;

Figure 7 is a view, similar to Figure 2, showing a corner block;

Figure 8 is a fragmentary perspective of the interior construction at a joint between adjacent vertical and adjacent horizontal blocks which are aligned in both directions, the view also showing a preferred type of clip utilized for adjacent block flanges having outwardly-directed grooves, upon both sides of which grooves the joints are located;

Figure 9 is a fragmentary perspective view, similar to that shown in Figure 8, but showing a joint where the adjacent horizontal blocks only are aligned, and a type of clip suitable for such joints;

Figure 27 is a side elevation, partially broken away, on the longitudinal plane indicated by the line 27—27, Figure 28, of a form of the improved hollow building block, having a structure suitable for fastening adjacent blocks together, without the necessity of using separate coupling and sealing bars;

Figure 28 is a plan view of the block shown in Figure 27, the view being partially in horizontal section, longitudinally of the block, and indicated by the line 28—28, Figure 27;

Figure 29 is a vertical cross-section, taken in the plane indicated by the line 29—29, Figure 27;

Figure 30 is an end view of the block shown in Figure 27;

Figure 31 is a fragmentary perspective of the joint formed by two assembled adjacent blocks of the structure shown in Figures 27-30;

Figure 10:
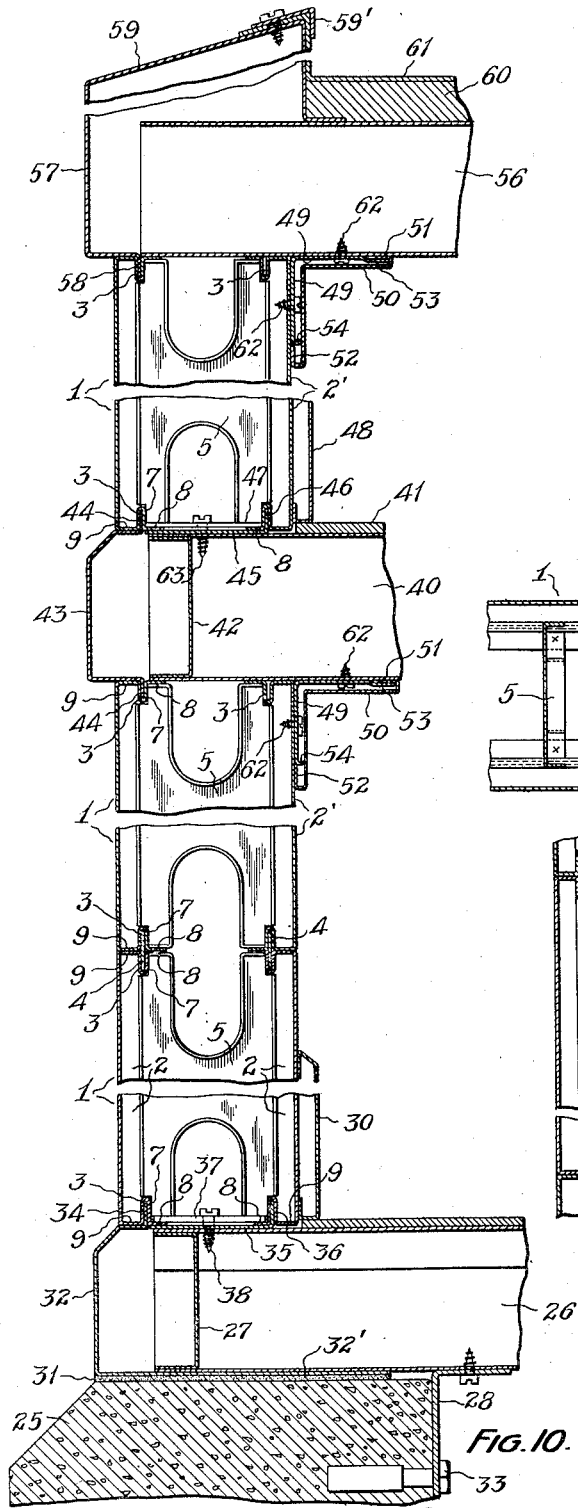
Figure 10 is a broken vertical section transversely through an outer building wall constructed of assembled blocks of the character shown in Figures 1-4, fragmentary portions of the building foundation, intermediate floor, and roof, being also shown.

Figure 32 is a side elevation, partially broken away, on the longitudinal plane indicated by the line 32—32, Figure 33, of a form of the improved hollow building block which provides an opening in the joint between adjacent blocks upon the outer face, or the faces, of the wall formed by the assembled blocks, which opening receives mastic, asphalt, or other suitable calking and weather-proofing material;

Figure 33 is a plan view of the block shown in Figure 32, the view being partially in horizontal section, longitudinally of the block, and indicated by the line 33—33, Figure 32;

Figure 34 is a vertical cross-section, taken in the plane indicated by the line 34—34, Figure 32;

Figure 35 is a fragmentary perspective of the joint between adjacent assembled blocks of the structure shown in Figures 32-34, the opening in which joint is filled with suitable calking or weather-proofing material;

Figure 36 is a fragmentary perspective, similar to Figure 35, but showing a modified form of joint having calking or weather-proofing material;

Figure 37 is a fragmentary vertical longitudinal section through two relatively vertically adjacent assembled blocks fastened together by a modified form of clip structure;

Figure 38 is a fragmentary plan section, taken in the plane indicated by the line 38—38, Figure 37; and Figure 39 is a fragmentary transverse vertical section, taken in the plane indicated by the line 39—39, Figure 37.

Referring to the annexed drawings in which the same parts are indicated by the same respective numbers in the several views, and particularly referring, first, to Figures 1-4, the improved hollow building block 1, which is preferably of rectangular side and end formation, includes two identical side members 2 connected in laterally spaced relation by spaced transverse vertical one-piece members in the form of webs 5 having longitudinally-extended flanges 13. Each side member 2 comprises a face plate 2' having a transversely-extended edge flange comprising an inner terminal edge portion 8 and an outer portion 9 connected by an intermediate U-shaped portion 7 having a base part 7', and of a length sufficient, and its opposed legs sufficiently spaced, to form an outwardly-directed coupling-bar groove 3 which extends around the plate flange upon all four sides thereof substantially midway the depth of the flange. Both the flange of the side member 2 and the groove 3 extend inwardly of the space comprehended between the opposed face plates 2'. The flange portions 8 and 9 are in substantial transverse alignment and the legs of the U-shaped member 7 forming the groove 3 are in substantially parallel relation.

The grooves 3 are described as being "outwardly-directed," although they are formed interiorly of the blocks. By "outwardly-directed" it is meant that the grooves 3 open outwardly of the blocks or are formed on the exterior faces of the flanges 8—9.

In describing the flanges 8—9 as being "inwardly-extended," applicants mean that they are within, or substantially within, the block area, and that the flange of each face member is opposed to and extended toward the flange of the other face member of the same block.

The side member 2 of the block 1 is formed up into the described structure from a suitable one-piece rectangular blank suitably cut to form the corners of the flange portions 8 and 9 and the intermediate U-shaped member 7, the adjacent corner portions being welded together to form a unitary block side member 2 after the blank has been formed up into the proper shape. In order to form the complete block 1, the block side members 2 are secured to the two ends of the spaced web members 5, the securing being effected by welding the outer faces of the end portions of the flanges 13 of the webs 5 to the inner faces of the plate flange portions 8 and the inner legs of the U-shaped member 7.

The top and bottom portions of the webs 5 are materially cut away at their central parts, thereby providing relatively large openings 11, which effects a considerable lightening of the weight of the block 1 and also provides continuous horizontal openings through horizontally adjacent blocks 1 for the accommodation of pipes, conduits, etc. Continuous vertical openings 12 for such accommodation are provided between adjacent web members 5 of each block 1; as also, between adjacent web members 5 of adjacent blocks.

The structure afforded by an assembly and securing together of the described elements is the hollow block 1 clearly shown in Figures 1 and 2. A building wall is formed by assembling and securing together vertically adjacent courses of such blocks 1; as also, securing together the horizontally adjacent blocks in each course, with the adjacent outwardly-directed grooves 3 aligned. Such securing together of the blocks 1 is effected by various convenient means, one of which is shown in Figure 5, and consists of a coupling and sealing bar 4 which is accommodated with a close fit in the opposed grooves 3 of two vertically adjacent courses of blocks 1, each course being comprised of the desired number of horizontally adjacent blocks 1. Short coupling and sealing bars 4 are used for the vertical joints formed by opposed grooves 3, such short bars 4 lying intermediate the adjacently upper and lower long longitudinal coupling and sealing bars 4. As shown in Figure 5, the coupling bars 4 are independent members separate from the blocks 1 which they secure together.

Although a structure of hollow blocks such as described renders it an inherent insulator, satisfactorily so for certain structures without the addition of other insulating materials, the side portions of the block 1 adjacently interior of the face plates 2', and between the latter and the adjacent leg of the U-band 7, form convenient beds for slabs of insulating material 15, such as shown in Figure 6, if it is deemed advisable to utilize such insulating material, the channel construction formed by the edge portion of the face plate 2', the flange portion 9, and the outer leg of the U-shaped member 7, providing efficient means for retaining the insulating slab 15 in position.

A block for the corner of a building is of the same general construction as the block 1, Figures 1 and 2, preferably being of the same longitudinal dimension as the block 1, and having a notched inner side and outer corner with a ninety-degree angle extension, such as illustrated in Figure 7, wherein a block 6 having the angular extension 6' illustrates the formation.

In assembling a wall from a plurality of blocks 1, the vertical joints between laterally adjacent blocks of vertically adjacent courses may be aligned or staggered, and the effect, insofar as the interior construction is concerned, is shown in Figure 8 for aligned joints, and in Figure 9 for staggered joints. Various forms of clips can be utilized for tying together the adjacent blocks 1 at their abutting flanges, in addition to the coupling and sealing bars 4 positioned in the opposed grooves 3. For an aligned joint, such as shown in Figure 8, a clip 18 can be utilized, which clip 18 is of symmetrical cross-like formation having a central body portion 18' and four equally spaced radial jaw-like arms 18² each adapted to grip two opposed flange portions 8, the opposed pads of these jaws 18² being somewhat flared at their outer edges so as easily to find and enter over the exterior faces of the two flange portions 8. These clips 18 are easily inserted and secured in tying position, as each course of blocks 1 is laid, by inserting them over the blocks and down through the openings 12 afforded between laterally adjacent block webs 5.

The clip 18 may also be used for staggered vertical joints, but in Figure 9, another form of clip 20, particularly adapted for use with staggered joints, is shown, this clip 20 comprising a central U-shaped elongated body member 20' adapted to cover the joint formed by the flange portions 8 of two laterally adjacent blocks 1 and the flange portion 8 of an adjacently vertical block which laps the vertical joint between the two blocks previously mentioned, the body member 20' gripping said three flange portions 8 and having two flange portions 20² extended outwardly therefrom, one of which presses against the inner longitudinal leg of the U-shaped member 7 of the overlapping block 1, and the other of which flanges 20² presses against the adjacent inner longitudinal legs of the U-shaped members 7 of the two laterally adjacent blocks 1, this latter flange 20² being transversely slotted to accommodate the two adjacent vertical flange portions 8 of said two laterally adjacent blocks 1.

Figures 8 and 9 clearly indicate the use of the coupling and sealing bars 4. For the constructions shown in Figures 8 and 9 no coupling and sealing members are required other than the members 4 and 18, or 20, but the improved hollow block can be formed to permit the use of gasket material, mastic, or other suitable calking and weather-proofing material, and the use of other coupling means, as hereinafter fully described.

Referring particularly to Figure 10, there is shown a broken vertical transverse section of an outer building wall built up of a plurality of blocks 1, shown in Figures 1 and 2, interlocked with a building foundation consisting of the masonry sub-wall 25, longitudinal girders 26, and cross-channels 27, and related elements; a flat roof 60—61, longitudinal top girders 56, and related elements; and an intermediate floor 40—41—42, and related elements.

For purposes of illustration, the longitudinal foundation girders 26 are shown as mounted at their ends upon the masonry sub-base 25, an angle 28 being secured to said girder 26 and whose vertical leg is fastened by the bolt 33 to the masonry sub-base 25. Upon the top of the masonry 25 is mounted a pad 31 of asphalt upon which rests the end of the girder 26 and the transverse channel 27, there being interposed between the pad 31 and the girder 26 and channel 27 an inwardly-extended elongated flange 32' of an exterior wall-bottom sill 32 which, at the top, is inclined inwardly and has a top terminal portion of angular formation of which the extreme terminal portion 34 is adapted closely to fit within the portions of the exterior grooves 3 which are upon the bottom sides of the bottom hollow blocks 1 of the building wall. Extended into the opposed inner grooves 3 of said bottom hollow blocks 1 is an upwardly-directed flange 36 of an angle 35 which extends transversely across and below the bottom hollow blocks 1 and rests upon the girders 26 and the channel 27, this angle 35 being secured, as by screws 38, to the girders 36, the screws 38 passing through a plate 37 which rests at its ends upon the flange portions 8 of the side members 2 of the bottom hollow blocks 1. Secured to the inner faces of the hollow bottom blocks 1 is a base-board 30 which rests upon the floor 29 mounted upon the girders 26.

At the roof, for purposes of illustration, there is shown an upper exterior finish member, in the form of an overhanging cornice 57, which has a lower angular portion whose outwardly-extended terminal 58 is closely fitted within the outer grooves 3 of the tops of the top hollow blocks 1. The top portion 59 of the cornice 57 is bent inwardly and inclined upwardly and secured to an upwardly-extended angular marginal portion of the roof surface 61 by an angular ridge member 59'. The inner end of the cornice 57 is bent angularly downwardly and secured under the roof plates 60. The top girders 56 cover the inner grooves 3 at the tops of the uppermost hollow blocks 1 and the corner at the joint between the bottoms of the girders 56 and the inner faces 2' of the topmost hollow blocks 1 is finished by securing in said corner a base angle 49 whose lower end 54 is bent inwardly in semi-hook formation and bears against the body portion of an inwardly-spaced angle 50 having a lower outwardly-bent channel portion 52 whose terminal portion bears flush against the upper faces 2' of the uppermost blocks 1 in vertical alignment with the outer face of the angle 49, the upper part of the angle 50 also having an outwardly-extended channel portion 51 interiorly engaged by an inwardly-extended angular portion 53 of the angle 49. The angle 49 is secured to the under surfaces of the girders 56 and to the inner face plates 2' of the uppermost hollow blocks 1, as by screws 62, the heads of these screws 62 being hidden beneath the angle 50.

Figure 10 also shows an intermediate floor 40 associated with the wall assembled from the hollow blocks 1. For purposes of illustration, a coping 43 is shown for this combination, the same being quite similar in structure to the bottom of the cornice 57 and the top of the lower sill 32, in that the lower portion of the intermediate coping 43 is of angular formation whose terminal is closely fitted in the exterior grooves 3 at the tops of the hollow blocks 1 whose upper surfaces lie flush with the bottoms of the floor girders 40, said intermediate coping 43 also having an upwardly-inclined top portion whose terminal 44 is of angular formation and is closely fitted into the outer grooves 3 at the bottoms of those hollow blocks 1 whose lower surfaces are substantially in alignment with the floor 41. Extended into the inner grooves 3 of the bottoms of those hollow blocks 1 which cooperate with the top of the intermediate coping 43 is the upwardly-extended angular end 46 of a plate 45 which rests upon the girders 40 and extends transversely across the lower ends of the adjacent hollow blocks 1 and which is secured to the girders 40 and also to the hollow blocks by screws 63 passed through a plate 47 mounted at its side edges upon the flange portions 8 of the hollow blocks 1. A finish is provided for the bottom corners of the upper compartment above the floor 41 by a base-board 48 and a finish for the upper corner of the lower compartment below the girders 40 by a structure similar to that which has been described hereinbefore relative to the upper corner of the upper compartment.

Figure 11:
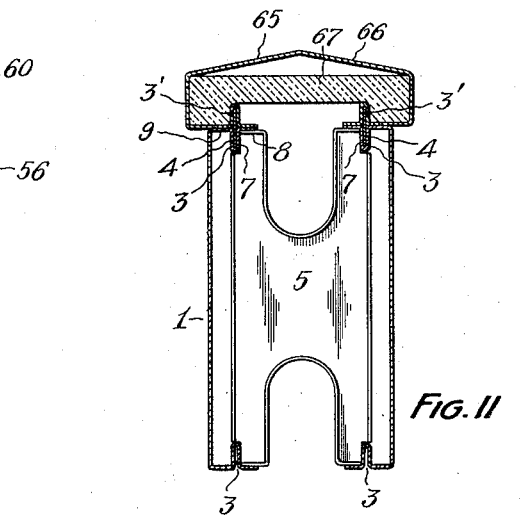
Figure 11 is a section, similar to Figure 10, through only the top block of a building wall having a modified form of a cap for the top of the wall.

Referring particularly to Figure 11, there is disclosed a modified form of cap 65 for the top of a building wall and adapted to cooperate with the topmost hollow blocks 1 of the wall, this cap 65 comprising an upwardly-extended body portion having opposed side plates, and opposed end plates (not shown), together with a crown top structure 66, and lower inwardly-extended angular portions formed into intermediate outwardly-directed grooves 3', similar to the groove formations shown in the hollow block of Figures 1 and 2, these grooves 3' being aligned with the respective grooves 3 of the top hollow blocks 1 and accommodating, in conjunction with the grooves 3, a coupling and sealing bar 4. The cap 65, of Figure 11 is shown as being provided with a block 67 of insulating material.

Figure 12:
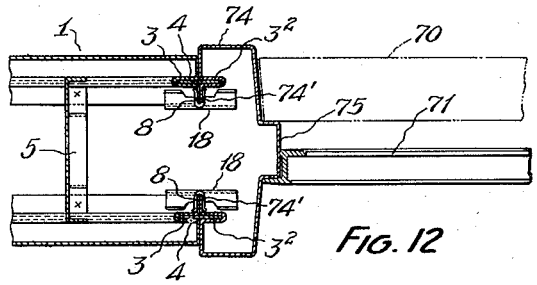
Figure 12 is a fragmentary plan section, longitudinally of a building wall such as illustrated in Figure 10, showing an adaptation of the improved hollow building blocks at the jambs or headers of doors, and at the joints, headers, and sills of windows.

Referring particularly to Figure 12, there is shown an adaptation of a building wall formed of the improved hollow block 1 to the headers of doors and sills of windows set into such wall. For this adaptation, the outwardly-directed grooves 3 of the sides of the adjacent hollow blocks 1 are aligned with corresponding grooves $3^2$ formed in a box-like member 74 extended throughout the height or width of the header or sill and having an intermediate extension portion 75 directed toward the window or door space and against which bears the edges of the window casement 71, or the jamb of the door, the door or window threshold or ledge being indicated by the dot-and-dash showing 70. The outer side of the box-like member 74 is of an angular and groove structure complementary to the end structures of a plurality of superimposed blocks 1. To fasten together the adjacent elements of the wall and window, or door, i. e., the flange portions 8 of the hollow block 1, and flange portions 74' of the box-like member 74, clips 18, similar to those shown in Figure 8, may be utilized. If desired, clips 20, such as those shown in Figure 9, are suitable for use at this point. Also, coupling and sealing bars 4 are mounted with a tight fit in the aligned grooves 3 and $3^2$ of the adjacent hollow block 1 and the box-like member 74, respectively.

Figure 13:
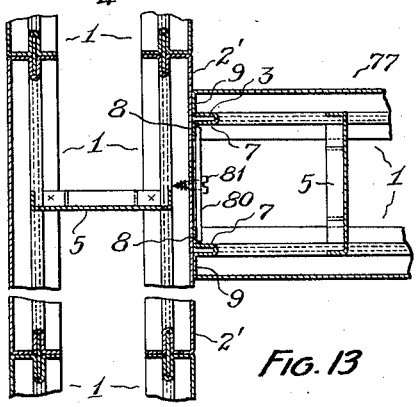
Figure 13 is a broken and fragmentary plan section, transversely of an outer building wall, showing an adaptation where an interior partition wall, also formed of the improved hollow blocks, joins the outer wall.

Referring particularly to Figure 13, which is a broken fragmentary plan section through a building wall assembled from the improved hollow blocks 1 and an abutting partition wall 77 also formed of hollow blocks of this character, it will be noted that the blocks 1 of the partition wall 77 are turned in a horizontal plane at a ninety-degree angle to the position of the blocks of the main outside wall. The end blocks of the partition wall 77 are secured to the inner face plates 2' of the hollow blocks of the outside wall by vertical plates 80 fastened tightly against the terminal flange portions 8 of the end blocks 1 of the partition wall 77 through the medium of screws 81 which pass through the inner face plates 2' of the outer wall blocks 1. The partition wall 77 is assembled by a combination of interlocked blocks, similar to the assembly for the main outside wall, these hollow blocks of the partition wall 77 being, as stated, laid at a ninety-degree angle to the main wall blocks.

Figures 10–13 and the description of the structures shown therein illustrate how readily the improved hollow building block 1 is adapted for cooperation with other building elements; as also, illustrate how the same structure of block can be used for longitudinal walls, transverse walls, vertical walls, and horizontal walls. Furthermore, there is no undue expense or labor involved in adapting the block wall assembly to the other parts of the building, or in combining it with known building materials and by approved methods of constructing buildings.

Figure 14:
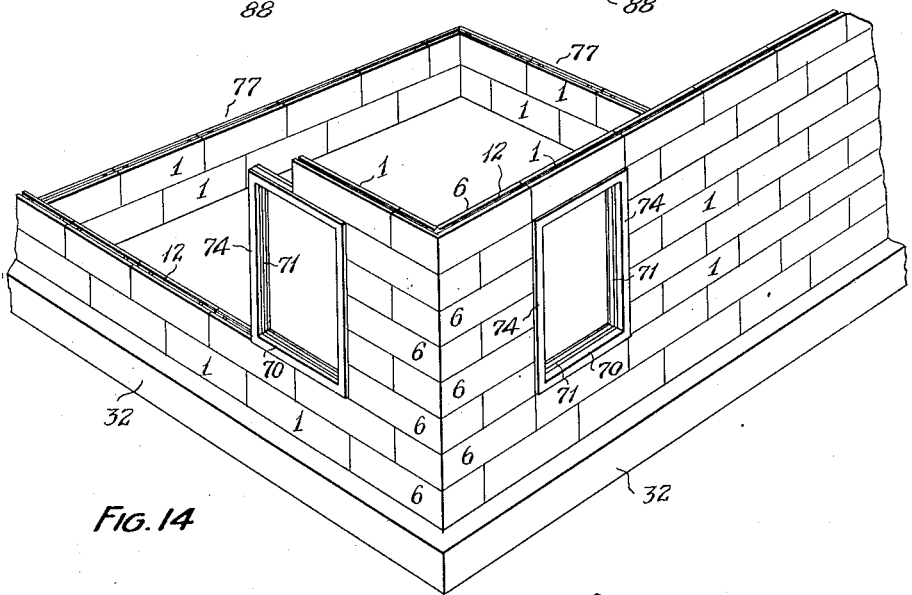
Figure 14 is a perspective view, showing a portion of a corner of a building structure, including a partition wall, formed of hollow blocks of the character shown in Figures 1-4, the vertical joints between horizontally adjacent blocks in the several vertically adjacent courses being staggered.
Figure 15:
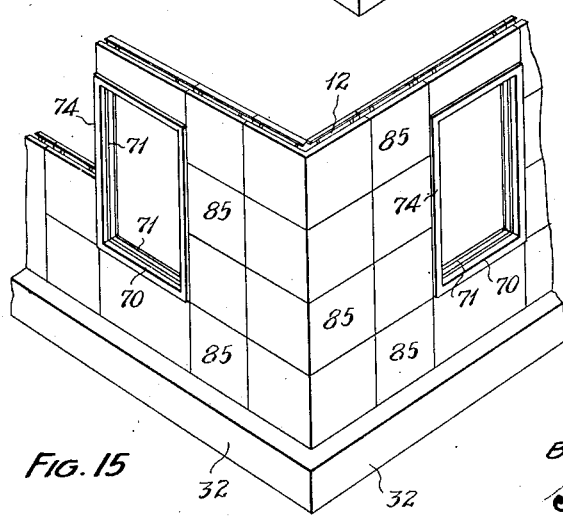
Figure 15 is a perspective view, showing a portion of a corner of a building structure formed of the hollow blocks, but in which the blocks are aligned in both directions, and in which the blocks are of different dimensions than those shown in Figure 14.

The assemblies designed to be illustrated by Figures 14 and 15 will be clearly understood by an inspection of said figures, it being noted that Figure 14 illustrates a corner of a main wall and the corner of a cooperating partition wall, in which walls the hollow blocks 1 and 6 are laid so that the vertical joints between horizontally adjacent blocks are staggered in adjacent courses; and that Figure 15 illustrates the formation at the corner of a main wall comprised of hollow blocks 85 of different dimensions than the block 1, shown in Figures 1 and 2, and laid so that the vertical joints are aligned. Both Figures 14 and 15 indicate the adaptation to the walls shown therein of a couple of window structures.

Figure 16:
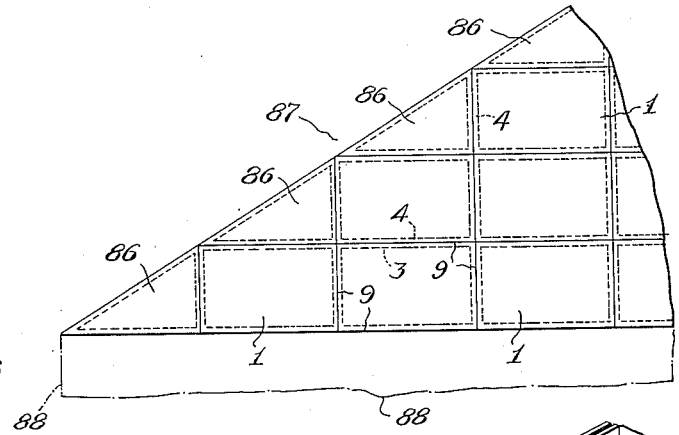
Figure 16 is a fragmentary side elevation showing a construction and arrangement of the improved blocks adaptable to the formation of an inclined wall, such as a roof gable.

As is well known, it may be desirable that various walls of a building structure, such as the wall of a roof gable, for instance, be inclined, and Figure 16 is a fragmentary side elevation of such an adaptation formed from the improved hollow block 1. In Figure 16, considered as illustrating a portion of a roof gable 87, mounted upon the main roof, or upon the top of a building side wall 88, the wall of the gable 87 is formed of complete blocks 1 combined with part-blocks 86 formed to give the desired inclination to the side of the gable 87, the part-blocks 86, shown in Figure 16, being substantially half-blocks, of triangular formation, to give a gable inclination of forty-five degrees.

Figure 18:
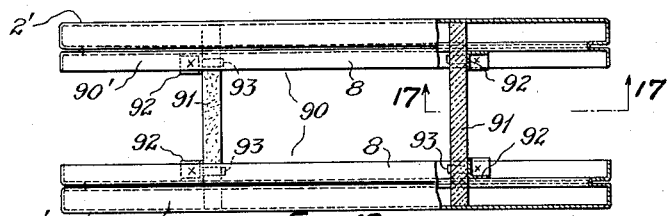
Figure 18 is a plan view of the block shown in Figure 17, the view being partially in horizontal section, longitudinally of the block, and indicated by the line 18—18, Figure 17.
Figure 17:
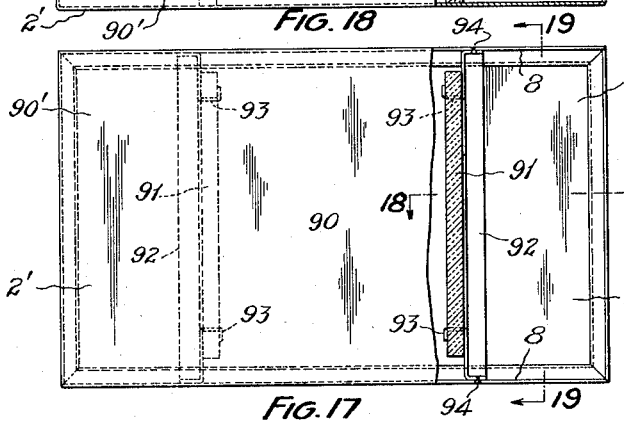
Figure 17 is a side elevation, partially broken away, on the longitudinal plane indicated by the line 17—17, Figure 18, of a modified form of the improved hollow building block, the same having a composition nonconductive intermediate or web structure, such as wood or asbestos webs.
Figure 19:
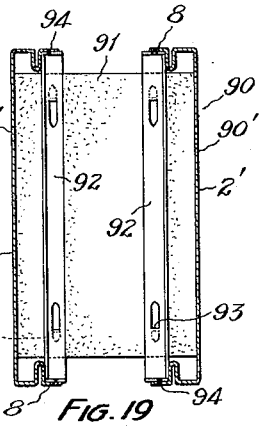
Figure 19 is a vertical cross-section, taken in the plane indicated by the line 19—19, Figure 17.

The form of improved hollow building block 90 shown in Figures 17–19 includes non-conductive intermediate or web structures, such as composition or wood-treated webs. Composition webs 91 is the type of webs actually shown in these Figures. Inasmuch as the composition slabs 91 are non-conductive, they can be set at their side edges snugly against the face plates 2' and they are thus shown in Figure 19, and hence contribute considerable compressional strength to the block faces 2'. In order to secure the composition slabs 91 to the two side portions 90' of the block 90, angles 92 are provided, one for each side portion 90' of the block 90, secured in parallel relation with the faces 2' to the portions 8 of the peripheral flanges of the face plates 2', such securing being preferably by welding, as illustrated by "94," and prongs 93 are formed from the material of these angles 92 and passed through pre-punched holes in the composition slabs 91 and clinched against the opposite faces of the slabs 91. The provision of the angles 92 and the welding thereof to the flanges of the face plates 2' also provides additional strength to the block 90.

The form of block shown in Figures 17–19 is also particularly adaptable when porcelain enamelled blocks are required, since the two side portions of the block 90 can be enamelled separately, and no welding would be required in order to secure the enamelled side portions to the non-conductive web 91 in assembling the block elements into a unit.

Figure 21:
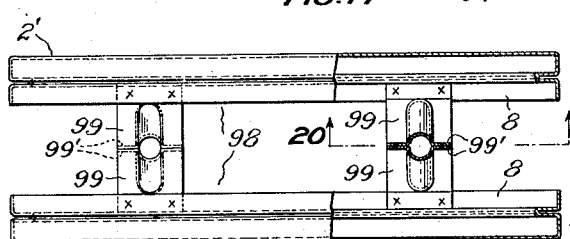
Figure 21 is a plan view of the block shown in Figure 20, the view being partially in horizontal section, longitudinally of the block, and indicated by the line 21—21, Figure 20.
Figure 20:
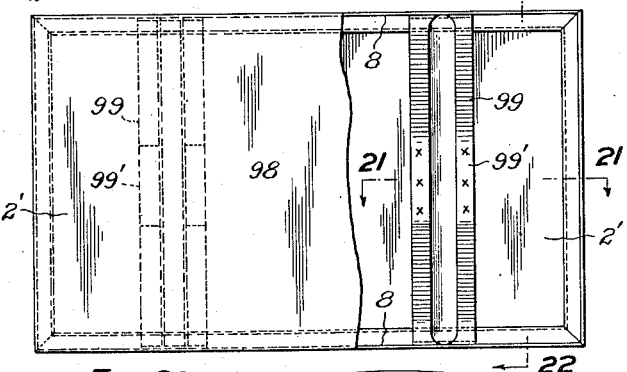
Figure 20 is a side elevation, partially broken away, on the longitudinal plane indicated by the line 20—20, Figure 21, of another modified form of the improved hollow building block, the same having a different intermediate web structure than that shown in Figures 1 and 2.
Figure 22:
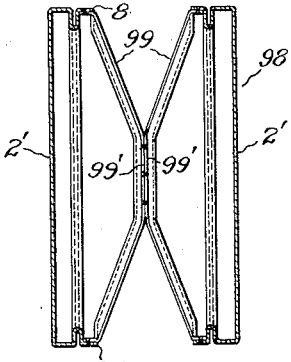
Figure 22 is a vertical cross-section, taken in the plane indicated by the line 22—22, Figure 20.

The form of improved hollow building block shown in Figures 20–22 also has advantages providing additional strength and the cutting down of heat and cold transfer and sound penetration through the block walls. In this form of block 98, the intermediate connecting and strengthening webs 99 are each comprised of a pair of straps which are welded at their ends to the portions 8 of the flanges of the face plates 2' and welded to each other in an area intermediate their ends. Each of the straps of this web 99 is secured by angular end portions to only one flange portion 8. The central area 99' of each web strap is secured to a like area of the other strap. The contacting central areas 99' of the two straps, which are welded together, are each circular in cross-section, as clearly appears in Figure 21, and are very small areas, so that there is a very slight amount of material through which heat and cold can be transferred, or sound penetrate, from one face plate 2' to the opposite face plate 2'. Additional strength for the block 98 is derived from the connecting webs 99, by reason of the fact that the latter are of fluted formation, as also clearly appears in Figure 21.

Figure 23:
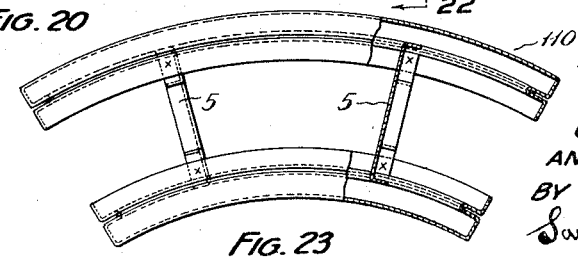
Figure 23 is a plan view, partially in longitudinal horizontal section, of a modified form of the improved hollow block suitable for building a circular wall.

The improvements in hollow building blocks hereinbefore described are equally applicable to a type of block suitable for building a circular wall, and such a block 110 is illustrated in Figure 23. The elements of the side portions of the block 110 are bent to the desired curvature, with the ends of the two side portions radially aligned, and these side portions connected together by strengthening webs 5, as clearly shown in Figure 23.

Figures 24, 25:
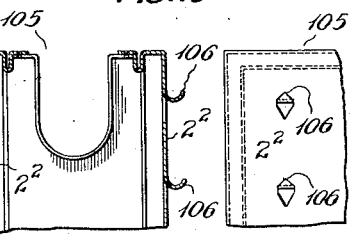
Figures 24 and 25 are, respectively, a fragmentary vertical cross-section, and a fragmentary side elevation, of a form of improved hollow building block, embodying the principle of our invention, and having outwardly-extended prongs suitable for anchoring interior plaster or exterior stucco.

The block 105, shown in Figures 24 and 25, is similar to the preferred type of block shown in Figures 1–4 with the added advantage, where such construction is desired, of having prongs 106 formed out of the material of the face plates $2^2$, which prongs 106 serve to anchor wall coverings such as interior plaster and exterior stucco.

Figure 26:
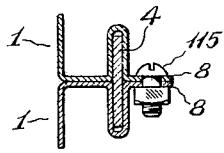
Figure 26 is a fragmentary transverse vertical section of a joint between a pair of relatively vertical superimposed blocks, illustrating the bolt, screw, or pin method of fastening the blocks together at the inner end of the joint.

Oftentimes, simple bolts, screws, or pins, are sufficient, or most desirable, for fastening together the abutting flange portions constituting the joints between adjacent blocks 1, and such a method of fastening the inner joint is illustrated by the screw 115, Figure 26.

The assembling and interlocking of a plurality of hollow building blocks having our improvements, without the necessity of utilizing separate coupling and sealing members, such as the bars 4, can be effected by a structure and reorganization of the block elements, such as shown in the block 120, illustrated in Figures 27–31. This reorganization of the structure of the block elements consists in providing the peripheral outwardly-directed groove 121 in the flange of the face plate $2^3$ only in two adjacent sides of the flange, and, upon the other two sides of the flange, bending the material thereof outwardly to form salients 122 which are aligned with the grooves 121 and complementary thereto so as to snugly fit the grooves of an adjacent block when the two blocks are assembled in aligned positions. Referring particularly to Figure 27, the left hand side and the bottom of the face plate $2^3$ has a flange portion in which is provided the groove 121, and the right hand side and the upper edge of the face plate $2^3$ has a flange portion from which is formed the salient 122, those diagonal corners of the face plates $2^3$ at which an end of the groove 121 and an end of the salient 122 meet being notched, as required. A perspective of the joint formed by two adjacent assembled blocks 120 of the character described is clearly shown in Figure 31.

The flange portions of adjacent blocks thus far described lie flush one with the other, and satisfactory joints between adjacent blocks are afforded.

Oftentimes, however, special expedients are advisable for weather-proofing outside joints. A form of block 130 by means of which such an expedient can be employed is illustrated in Figures 32–35. The underlying principle is to make use of mastic, or asphalt, or other suitable calking and weather-proofing material at such outside joints. To effect this result, the block 130 is formed so as to provide an opening at the outside joint between two adjacent blocks 130, which opening can be filled with the calking and weather-proofing material. This outer opening, such as the opening 131, Figure 35, is obtained by forming the U-shaped formation 7' of the flange of the face plate $2^4$ so that its inner leg is longer than its outer leg whereby the flange portion 8' extends outwardly somewhat further than the flange portion 9'. Therefore, when two blocks 130 are assembled, as shown in Figure 35, with their opposed flange portions 8' closely superposed, the flange portions 9' thereof are somewhat spaced and hence form an opening 131 therebetween. This opening 131 is filled with suitable mastic 132 to provide the desired weather-proofed joint.

Oftentimes, further, it is desirable to have the mastic for an outside joint set or harden into a wedge-shaped body 136 with its broader or base edge adjacent the U-formations 7². Such a structure is illustrated in Figure 36. In developing this structure, when the flanges of the face plates 2⁵ of such blocks 135 are operated upon to form the U-shaped formations 7², the flange portions 9², and the outer legs of the U-formation 7², are so formed as to cause the plane flange formations 9² to make an acute angle with the face plate 2⁵, and an obtuse angle with the outer plane legs of the U-formations 7², whereby the desired joint formation in an assemblage of a plurality of the blocks is obtained.

The block joints having mastic or other weather-proofing filler can be used when it is desirable to glaze or fill the joints to form a perfectly smooth or lineless wall, or to point certain joints or to leave exposed lines to form rectangular shapes or plain horizontal or vertical lines as desired. The weather-proofing material or glazing compound is spread on the edges of the hollow blocks after the coupling and sealing bar 4 is forced into place in one block or a course of blocks, and then the adjoining blocks are set into place, and any excessive weather-proofing material or glazing compound forced out of the grooves 3 is glazed smooth or pointed as required.

The calking or other weather-proofing material can be brushed on, or sprayed on, or it can be prefabricated in coils or reels, and cut to fit when used in the field.

In addition to the clip formations for inner joints, shown in Figures 8 and 9, and the screw fastening shown in Figure 26, a special form of clip 140 for fastening together the inner flange portions 8 of adjacent blocks 1 is shown in Figures 37–39. This clip 140 has an elongated main body structure 142 which is positioned in parallel longitudinal relation with the flange portions 8 of the blocks 1 secured thereby. The use of the clip 140 requires the formation of aligned slots 141 in the superposed block flange portions 8, through which slots 141 the clip 140 extends, the elongated body portion 142 being above the flange portions 8 and resting at its two ends upon the upper flange portion 8 upon both sides of the upper slot 141, and the lower portion 143 of the clip 140 closely engaging the under face of the lower flange portion 8, adjacent one end of the upper slot 141, and forming with the superposed end of the upper clip portion 142 a jaw member snugly fitting over the two thicknesses of flange portions 8. In order to lock the clip 140 in the slots 141, the small end of the clip 140 opposite that end forming the jaw is provided with a shoulder portion 144 which fits tightly against the adjacent walls of the slots 141. The last-mentioned structure positively obviates any possible chance of the interlocked blocks shifting relatively. The lower portion 143 of the clip is made slightly shorter in length than the length of the slots 141 so that the clip may be easily dropped through the slots 141 and then positioned. For raising the portion 143 of the clip 140 out of the slots 141, a hole 146 is formed in the narrow end of the clip which will serve for engaging the clip with a hook tool so that the clip may be withdrawn as desired. The nose of the lower jaw part 143 is tapered as indicated by "147" so that the jaw may be freely guided over the edges of the superposed flange portions 8, adjacent one end of the slots 141, without binding. The upper jaw portion 148 is somewhat longer than the lower jaw portion 143 whereby the clip 140 is kept from falling through the slots 141 when it is applied. The lower edge 145 of the narrow end of the clip 140 is tapered so as to provide an easy entrance therefor into the slots 141 of the superposed flange portions 8, when the clip 140 is being applied, this tapered edge 145 creating a spring tension downward, so that, when the clip 140 is driven home, the shoulder 144 will be automatically locked in position.

We herewith note some of the salient points and important advantages of our improvements in building structures:

The hollow block is extremely strong, and when a plurality of them are formed into a rigid structure, the latter, insofar as a small building, such as a small house, gas station, garage, etc., is concerned, serves without any structural backing or supporting framework. The connecting webs being flanged add materially to the strength of the block;

Each block being comparatively small represents a small area of a wall surface, as compared with metal panels, or metal walls comprised of comparatively few parts, so that each block presents a straight accurate surface, and will not become wavy or otherwise distorted by reason of coating processes, or thermic or other treatments;

Insofar as we are informed, the block will sustain more dead and live loads, erection loads, impact, wind, and other lateral forces, than any known component structural part of comparable weight and size and practicable cost;

The formation of the block minimizes any tendency to buckle or distort under lateral, vertical, or other stresses;

The blocks have more than adequate bearing surface, and are in shear with the coupling bar on both its inner and outer sides for the entire distance around four sides of the block;

The block is fire-resisting;

Both the face sides of the block are identical, and every block is of the same structure as any other block, except for blocks in special positions or at special joints, so that the blocks can be most economically manufactured by straight line production methods. Also, the fact that the blocks are of identical structure facilitates storage, handling, shipping, etc.

Preferably, each block is relatively small, and hence light in weight, and thus can be assembled in the building wall without the necessity of using cranes or other hoisting machinery. Furthermore, the blocks are easily assembled and also dismantled and, therefore, are very convenient for use in making temporary structures. Erection and dismantling costs are kept at a minimum, since the design of the block is such that unskilled labor can be employed therefor. Also, the blocks have a high salvage value, and there is little or no labor involved in reconditioning or cleaning them. In the assembling of the blocks on the job, no field fitting operations are necessary, such as nailing, sawing, riveting, burning, or welding;

The block can be galvanized, plated, or otherwise treated, to impart rust-resisting properties to the surfaces thereof, such treatment, if desired, being in the nature of an automatic shop coating and drying before storage or shipment; furthermore, the block lends itself to any desired finish, such as porcelain enamel, silica, plating, painting, etc.;

The block will accommodate itself to orthodox architectural designs, and may be used in conjunction with brick, stone, and wood exteriors;

The range of possible sizes for the block, and still preserve its advantages, is considerable, and it may be of any desired shape, such as curved for adaption to radii, or shaped for corners of polygonal walls, or for wall offsets, bays, towers, etc.;

The structure of the block is such that heat and cold conduction through a wall thereof, or sound penetration, rapidly thins down and dies out;

The block will accommodate various forms of insulating material as desired, and the entire chamber of the block may be filled with such material;

Buildings constructed of the improved blocks particularly insure safety in earthquake areas, inasmuch as it would be possible for the entire foundation under such a building to be destroyed, and the building itself sustain little or no permanent damage, and therefore provide an unusually safe haven;

Whenever any special band or staggered design is desired, the trim of the blocks, either standard or special blocks, can be fitted to conform to such desired design;

The structure of the blocks, and the manner of interlocking or fastening the same, are such that there is no twisting or other deflective action such as is inherent when nailing, riveting, or welding, are necessary; and The use of the blocks for walls in lavatories, hospitals, bath rooms, kitchens, and other similar wall adaptations, is highly advantageous, inasmuch as such block walls are rodent-proof, termite-proof, vermin-resisting, will not absorb odors, and are easily cleaned.

What we claim is:

1. A building wall comprised of a plurality of hollow building blocks each having transversely spaced face members, webs connecting the face members, the latter having opposed inwardly-extended peripheral flanges extended around the block face members, to which flanges the webs are secured, the flanges being formed to provide outwardly-directed grooves adaptable for the accommodation of block-coupling bars, the flanges of adjacent face members being in opposed relation, the blocks being assembled in vertically adjacent courses each comprised of laterally adjacent blocks to effect a wall assembly, the grooves of adjacent blocks being in aligned relation upon all opposed block surfaces, coupling bars in the grooves, and clip members respectively securing adjacent blocks together at their opposed flanges.

2. A hollow building block having transversely spaced face members formed with opposed inwardly-extended peripheral flanges, angles secured to the terminal portions of the opposed flanges, non-conductive webs secured to said angles and set at opposite edges snugly against the face members, the flanges being formed to provide outwardly-directed grooves adaptable for the accommodation of block-coupling bars to effect a wall assembly of a plurality of blocks.

3. A hollow building block having transversely spaced face members, webs of angular formation each consisting of opposed pairs, the opposed webs of each pair being secured to each other over a restricted area intermediate their ends, the face members having opposed inwardly-extended peripheral flanges to which the webs of each pair of webs are respectively secured, the flanges being formed to provide grooves adaptable for the accommodation of block-coupling means to effect a wall assembly of a plurality of blocks.

4. A building wall comprised of a plurality of blocks each having transversely spaced face members, webs connecting the face members, the latter having opposed inwardly-extended peripheral flanges to which the webs are secured, the blocks being assembled in vertically adjacent courses each comprised of laterally adjacent blocks, the flanges of the face members being formed to provide outwardly-directed grooves, the grooves of adjacent blocks being in registering relation, coupling bars in the registering grooves, and means securing together adjacent blocks comprising a clip, aligned openings in the flange portions of adjacent blocks through which the clip extends and in which it is tightly secured, said clip having a jaw portion tightly gripping said flange portions of the blocks adjacent said openings.

5. A building wall comprised of a plurality of blocks each having transversely spaced face members, webs connecting the face members, the latter having inwardly-extended peripheral flanges to which the webs are secured, the blocks being assembled in vertically adjacent courses each comprised of laterally adjacent blocks, the flanges of the face members being formed to provide outwardly-directed grooves and the flanges of adjacent face members being in opposed relation, the grooves of adjacent blocks being in registering relation, coupling bars in the registering grooves, and means securing together adjacent blocks at the opposed flanges.

6. A hollow building block having transversely spaced face members formed with opposed inwardly-extended peripheral flanges, strengthening members secured to the terminal portions of the opposed flanges, webs secured to the strengthening members and set at opposite edges snugly against the face members, the flanges being formed to provide grooves adaptable for the accommodation of block-coupling means to effect a wall assembly of a plurality of blocks.

7. A building wall comprised of a plurality of vertically-adjacent and laterally-adjacent hollow blocks each having spaced face members formed with opposed inwardly-extended peripheral flanges extended around the block, a web secured to and connecting the flanges of the face members of each block, the flanges of adjacent blocks being in face to face relation to form joints within the blocks, and means securing adjacent blocks together at their opposed flanges, the webs being disposed so as to provide openings into the interior of each block, the face member flanges being formed to provide grooves, and block-coupling means in the grooves, said plurality of blocks being assembled to form the wall with the grooves of adjacent blocks in cooperative relation with each other and with the block-coupling means in the aligned grooves, whereby the block-securing means can be applied to the interiors of the blocks progressively with the laying of the latter.

8. A building wall, characterized as in claim 7, in which the grooves are outwardly directed, in which the flanges are provided with intermediate inwardly-extending loop portions constituting the grooves, in which the webs are flanged, and in which the inner terminal portions of the flanges of the face members are secured to the web flanges.

9. A building wall, characterized as in claim 7, in which the blocks are assembled in vertically-adjacent courses each comprised of laterally-adjacent blocks with the webs thereof in vertical position, and in which the block-coupling means are bars frictionally held in the aligned grooves and of a length to tie the wall blocks together in groups, thereby to strengthen the wall.

10. A hollow building block having transversely spaced face members formed with opposed transversely-extended peripheral flanges, the flanges being bent inwardly between their edges to form outwardly-directed grooves for the accommodation of an independent block-coupling bar, a strengthening member extended between opposed sides of the flange of each face member in substantially parallel relation to the member, and a non-conductive web extended across the block from face member to face member and secured to the strengthening members, whereby a plurality of identical blocks can be assembled into a self-contained wall with the grooves thereof aligned and the blocks tied together in selective groups by coupling bars engaged in the aligned grooves, the wall being thereby strengthened.

11. A hollow building block having spaced face members formed with opposed inwardly-extended flanges, a 2-part web secured one part each to the respective flanges of the respective face members, the parts of the web being secured to each other over a restricted area intermediate their ends, the face member flanges being formed to provide grooves for the reception of block-coupling means, the construction being such that a self-contained wall can be formed of a plurality of blocks assembled with the grooves of adjacent blocks in cooperative relation with each other and with coupling means in the cooperating grooves.

GUSTAV WARNER HULT.
HARRY KINGSMILL.

REFERENCES CITED

The following references are of record in the file of this patent and in the parent case:

UNITED STATES PATENTS

| Number | Name | Date |
|---|---|---|
| 944,950 | Coyne | Dec. 28, 1909 |
| 1,630,698 | Florey | May 31, 1927 |
| 1,661,183 | Junkers | Mar. 6, 1928 |
| 1,778,881 | Alford | Oct. 21, 1930 |
| 1,962,906 | Mueller | June 12, 1934 |
| 2,017,973 | Jenkins | Oct. 22, 1935 |
| 2,061,281 | Lawlor | Nov. 17, 1936 |
| 2,076,388 | Venzie | Apr. 6, 1937 |
| 2,091,415 | Mauser | Aug. 31, 1937 |
| 2,137,767 | Betcone | Nov. 22, 1938 |
| 2,171,338 | Henderson | Aug. 29, 1939 |
| 2,173,020 | Kubach | Sept. 12, 1939 |
| 2,268,907 | Scott | Jan. 6, 1942 |
| 2,303,837 | Gurber | Dec. 1, 1942 |
| 2,333,999 | Guignon, Jr. | Nov. 9, 1943 |
| 2,352,807 | Sheldon | July 4, 1944 |
| 2,369,373 | Sheldon | Feb. 13, 1945 |

FOREIGN PATENTS

| Number | Country | Date |
|---|---|---|
| 820,650 | France | of 1937 |